United States Patent [19]
Shimaya et al.

[11] Patent Number: 5,579,049
[45] Date of Patent: Nov. 26, 1996

[54] APPARATUS AND METHOD FOR CONTROLLING EXPOSURE BY SHUTTER SPEED CONTROL AND/OR GAIN CONTROL

[75] Inventors: Hiroshi Shimaya; Yutaka Maeda; Chiaki Ichikawa; Toshio Nakajima, all of Asaka, Japan

[73] Assignee: Fuji Photo Film Co., Ltd., Kanagawa, Japan

[21] Appl. No.: 171,177

[22] Filed: Dec. 22, 1993

[30]    Foreign Application Priority Data

Dec. 22, 1992 [JP] Japan ................................. 4-356408
Jun. 10, 1993 [JP] Japan ................................. 5-163830
Dec. 14, 1993 [JP] Japan ................................. 5-342132

[51] Int. Cl.⁶ ............................................. H04N 5/238
[52] U.S. Cl. ............................... 348/364; 348/229
[58] Field of Search ............................. 348/207, 294, 348/362, 363, 364, 366, 367, 368, 296, 297, 229, 230; H04N 5/238

[56]          References Cited

U.S. PATENT DOCUMENTS 3,576,393  4/1971  Thompson ......................... 343/367
4,202,014  5/1980  Gilligan et al. ................... 348/367
4,516,172  5/1985  Miyata et al. .................... 348/364
4,843,476  6/1989  Fujoka et al. .................... 348/365
5,157,502  10/1992 Nakajima et al. ................. 348/296

Primary Examiner—Wendy Garber
Assistant Examiner—Tuan V. Ho

[57]          ABSTRACT

An object of the present invention is to bring a video signal obtained by imaging into a proper level without use of a controllable diaphragm. An imaging apparatus is provided with no controllable diaphragm. Peak detection is performed by a peak detecting circuit for each vertical scanning interval. A peak value is applied to a control device. Necessary shutter speed control in a shutter control circuit, gain control in a pre-amplifier circuit and gain control in a GCA are carried out. Consequently, the level of the video signal obtained by the imaging is adjusted to a proper level without controlling a diaphragm, to obtain an image of proper brightness.

26 Claims, 9 Drawing Sheets

APPARATUS AND METHOD FOR CONTROLLING EXPOSURE BY SHUTTER SPEED CONTROL AND/OR GAIN CONTROL

BACKGROUND OF THE INVENTION

1. Field of the Invention

The prevent invention relates to an imaging apparatus such as an electronic still camera or a video camera used in a presentation system and a control method thereof.

2. Description of the Background Art

In an imaging apparatus which is represented by an electronic still camera for imaging a subject to record a video signal representing an image of the subject on a recording medium, exposure control is required to obtain a video signal having an appropriate level. This exposure control is generally carried out by controlling a shutter speed and a diaphragm.

However, a driving circuit such as a driving motor is required to control the diaphragm, thereby raising costs as well as increasing the circuit scale. In addition, the development of software for the control of the diaphragm is required.

SUMMARY OF THE INVENTION

An object of the present invention is to allow a video signal having an appropriate level to be obtained without controlling a diaphragm.

An imaging apparatus according to a first aspect of the present invention comprises shutter means in which shutter speed is variable depending on a shutter control signal applied, imaging means for imaging a subject under exposure conditions realized by the shutter means to output a video signal representing an image of the subject, first amplifying means for amplifying a video signal outputted from the imaging means with gain controlled in accordance with a first gain control signal applied, second amplifying means for finely adjusting the level of the video signal amplified in the first amplifying means with gain controlled in accordance with a second gain control signal applied, a peak detecting circuit for performing peak detection of the video signal outputted from the imaging means, level difference detecting means for detecting a level difference between a peak level obtained by the peak detecting circuit and a proper peak level of a video signal, and control signal outputting means for applying, when the level difference detected by the level difference detecting means is large, a control signal causing the level difference to become smaller to at least one of the shutter means and the first amplifying means so as to carry out at least one of shutter speed control in the shutter means and gain control in the first amplifying means, while applying, when the level difference is small, the second gain control signal causing the level difference to become smaller to the second amplifying means so as to carry out gain control in the second amplifying means.

In an imaging apparatus comprising an electronic shutter in which shutter speed is variable depending on a shutter control signal applied, an imaging device for imaging a subject under exposure conditions realized by the electronic shutter to output a video signal representing an image of the subject, a first amplifier circuit for amplifying the video signal outputted from the imaging device with gain controlled in accordance with a first gain control signal applied, and a second amplifier circuit for finely adjusting the level of the video signal amplified in the first amplifier circuit with gain controlled in accordance with a second gain control signal applied, a method of controlling the imaging apparatus according to the first aspect of the present invention comprises the steps of detecting a peak level of the video signal outputted from the imaging device, detecting a level difference between the detected peak level and a proper peak level of the video signal, performing, when the level difference is large, at least one of processing for changing the gain of the first amplifier circuit and processing for changing the shutter speed in the electronic shutter so that the level difference becomes smaller, and performing, when the level difference is small, processing for changing the gain of the second amplifier circuit so that the level difference becomes even smaller.

According to the first aspect of the present invention, the peak level of the video signal obtained by imaging is detected. When the difference between the peak level of the video signal obtained by the imaging and the proper peak level of the video signal is large, the processing for changing the shutter speed or the processing for changing the gain of the first amplifier circuit is performed. When the difference between the peak level of the video signal obtained by the imaging and the proper peak level of the video signal is small, the processing for changing the gain of the second amplifier circuit is performed.

According to the first aspect of the present invention, a video signal having a substantially proper level is obtained without controlling a diaphragm. Consequently, no driving system for controlling the diaphragm is required, thereby making it possible to reduce costs and the circuit scale.

An imaging apparatus according to a second aspect of the present invention comprises shutter means in which shutter speed is variable, imaging means for imaging a subject under exposure conditions realized by the shutter means to output a video signal representing an image of the subject, amplifying means for amplifying the video signal outputted from the imaging means, a peak detecting circuit for performing peak detection of the video signal outputed from the imaging means, an average level detecting circuit for detecting an average level of the video signal outputted from the imaging means, first level difference detecting means for detecting a first peak level difference between a peak level obtained by the peak detecting circuit and a proper peak level, shutter controlling means for controlling the shutter means so that the first peak level difference becomes small, second level difference detecting means for detecting a second level difference between the peak level obtained by the peak detecting circuit and the average level obtained by the average level detecting circuit, and controlling means for carrying out shutter speed control in the shutter means or gain control in the amplifying means so that the average level approaches a proper average level when the second level difference detected by the second level difference detecting means exceeds a reference value for judging whether the level of the video signal is adjusted based on the average level or the peak level, while carrying out shutter speed control in the shutter means or gain control in the amplifying means so that at least the peak level approaches the proper peak level when the second level difference detected by the second level difference detecting means is not more than the reference value.

In an imaging apparatus comprising an electronic shutter in which shutter speed is variable, an imaging device for imaging a subject under exposure conditions realized by the electronic shutter to output a video signal representing an image of the subject, and an amplifier circuit for amplifying the video signal outputted from the imaging device, a method of controlling the imaging apparatus according to the second aspect of the present invention comprises the steps of detecting a peak level and an average level of the video signal outputted from the imaging device, respectively detecting a first peak level difference between the detected peak level and a proper peak level and a second level difference between the detected peak level and the detected average level, controlling shutter speed in the electronic shutter so that the first peak level difference becomes small, and carrying out the shutter speed control in the electronic shutter or gain control in the amplifier circuit so that the average level approaches a proper average level when the second level difference exceeds a reference value for judging whether the level of the video signal is adjusted based on the average level or the peak level, while carrying out the shutter speed control or the gain control so that at least the peak level approaches a proper peak level when the second level difference is not more than the reference value.

The fact that the second level difference exceeds the reference value implies that the image obtained by the imaging includes an extremely bright portion, so that the peak level rises more sharply than the average level. In this case, if the gain of the amplifier circuit, for example, is so controlled that the peak level falls in the dynamic range of the circuit, the average level of the video signal becomes significantly low (for example, not more than half of the range).

The above reference value is a reference value for classifying a case in which the adjustment of the level of the video signal is preferably made on the basis of the average value and a case where the adjustment is preferably made on the basis of the peak level (or the weighted average of the peak level and the average value), which can be determined by trial-and-error from experience, experiments or the like.

If the subject includes an extremely bright portion, the peak level rises sharply. If the level of the video signal is adjusted on the basis of the peak level, therefore, the entire image is liable to be dark.

According to the second aspect of the present invention, the above described second level difference is detected. If the second level difference is large, it is judged that the subject includes an extremely bright portion, so that the shutter speed control or the gain control in the amplifier circuit is carried out on the basis of the average level. Even if the subject includes an extremely bright portion, therefore, an image signal having substantially proper brightness from the overall and average points of view is obtained.

It is preferable that there are provided two amplifier circuits connected in cascade, to control the Gain of the amplifier circuit in the preceding stage when the difference between the detected average level and the proper average level or the difference between the detected peak level and the proper peak level is large, while finely adjusting the level of the video signal in the amplifier circuit in the succeeding stage.

This makes it possible to make level adjustment with relatively high precision.

An imaging apparatus according to a third aspect of the present invention comprises shutter means in which shutter speed is variable, imaging means for imaging a subject under exposure conditions realized by the shutter means to output a video Signal representing an image of the subject, amplifying means for amplifying the video signal outputted from the imaging means, a peak detecting circuit for performing peak detection of the video signal outputted from the imaging means, an average level detecting circuit for detecting an average level of the video signal outputted from the imaging means, level difference detecting means for detecting a level difference between a peak level obtained by the peak detecting circuit and the average level obtained by the average level detecting circuit, and controlling means for carrying out shutter speed control in the shutter means or gain control in the amplifying means so that the average level approaches a proper average level when the level difference detected by the level difference detecting means exceeds a reference value for judging whether the level of the video signal is adjusted based on the average level or the peak level.

In an imaging apparatus comprising an electronic shutter in which shutter speed is variable, an imaging device for imaging a subject under exposure conditions realized by the electronic shutter to output a video signal representing an image of the subject, and an amplifier circuit for amplifying the video signal outputted from the imaging device, a method of controlling the imaging apparatus according to the third aspect of the present invention comprises the steps of detecting a peak level and an average level of the video signal outputted from the imaging device, detecting a level difference between the detected peak level and the detected average level, and carrying out shutter speed control in the electronic shutter or gain control in the amplifier circuit so that the average level approaches a proper average level when the level difference exceeds a reference value for judging whether the level of the video signal is adjusted based on the average level or the peak level.

According to the third aspect of the present invention, the above described level difference is detected. When the level difference exceeds the reference value, it is judged that the subject includes an extremely bright portion, so that the shutter speed control or the gain control in the amplifier circuit is carried out on the basis of the average level. Even if the subject includes an extremely bright portion, an image signal having substantially proper brightness throughout is obtained.

The foregoing may be applied to an apparatus for illuminating a subject to obtain an image of the subject under the illumination.

If the subject is illuminated, the luminance of the subject is increased. In addition, the luminance of the same subject varies depending on illumination used. According to the present invention, therefore, it is possible to bring the video signal into a proper level even in such a case.

An imaging apparatus according to a fourth aspect of the present invention comprises shutter means in which shutter speed is variable, imaging means for imaging a subject under exposure conditions realized by the shutter means to output a video signal representing an image of the subject, amplifying means for amplifying the video signal outputted from the imaging means, a peak detecting circuit for performing peak detection of the video signal outputted from the imaging means, an average level detecting circuit for detecting an average level of the video signal outputted from the imaging means, weight ratio determining means for determining a weight ratio so that the larger a level difference between the peak level detected by the peak detecting circuit and the average level detected by the average level detecting circuit is, the larger the ratio of the average level is, while the smaller the level difference is, the smaller the ratio of the average level is, weighted average level calculating means for calculating a weighted average level of the peak level and the average level using the weight ratio determined by the weight ratio determining means, and controlling means for carrying out shutter speed control in the shutter means or gain control in the amplifying means so that the weighted average level calculated by the weighted average level calculating means approaches a proper weighted average level.

In an imaging apparatus comprising an electronic shutter in which shutter speed is variable, an imaging device for imaging a subject under exposure conditions realized by the electronic shutter to output a video signal representing an image of the subject, and an amplifier circuit for amplifying a video signal outputted from the imaging device, a method of controlling the imaging apparatus according to the fourth aspect of the present invention comprises the steps of detecting a peak level and an average level of the video signal outputted from the imaging device, determining a weight ratio so that the larger a level difference between the detected peak level and the detected average level is, the larger the ratio of the average level is, while the smaller the level difference is, the smaller the ratio of the average level is, calculating a weighted average level of the peak level and the average level in accordance with the determined weight ratio, and carrying out shutter speed control in the electronic shutter or gain control in the amplifier circuit so that the weighted average level calculated approaches a proper weighted average level.

According to the fourth aspect of the present invention, the weight ratio is determined from the peak level and the average level. The weight ratio is determined so that the weight of the average level and the weight of the peak level are equal to each other when the subject is bright throughout so that the difference between the peak level and the average level is small, while the weight of the average level is larger when the subject includes an extremely bright portion so that the peak level rises sharply and consequently, the difference between the peak level and the average level is large.

The weight ratio is determined depending on the brightness distribution in the subject, the weighted average level is calculated using the weight ratio determined, and the shutter speed control or the gain control in the amplifier circuit is carried out on the basis of the weighted average level calculated. Therefore, a video signal showing repatively proper brightness is obtained irrespective of the state of the subject.

It is preferable that there are provided two amplifier circuits connected in cascade, to control the gain of the amplifier circuit in the preceding stage when the difference between the weighted average level and the proper weighted average level is large, while finely adjusting the level of the video signal in the amplifier circuit in the succeeding stage.

A presentation system is a system for imaging a document (including a negative film or the like) by an imaging apparatus, applying a video signal obtained to a CRT display device, a TV projector or the like, and displaying the image in an enlarged manner. In the imaging apparatus in the presentation system, the position where the document is placed is previously determined. Consequently, the distance from the imaging apparatus to the subject is fixedly determined in many cases. Even if the depth of field of the subject becomes small by fixing a diaphragm or particularly providing no controllable diaphragm, therefore, no serious problems arise. Consequently, it is possible to omit control of the diaphragm. The present invention is particularly useful in such a system.

The foregoing and other objects, features, aspects and advantages of the present invention will become more apparent from the following detailed description of the present invention when taken in conjunction with the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

First Embodiment

Figure 1:
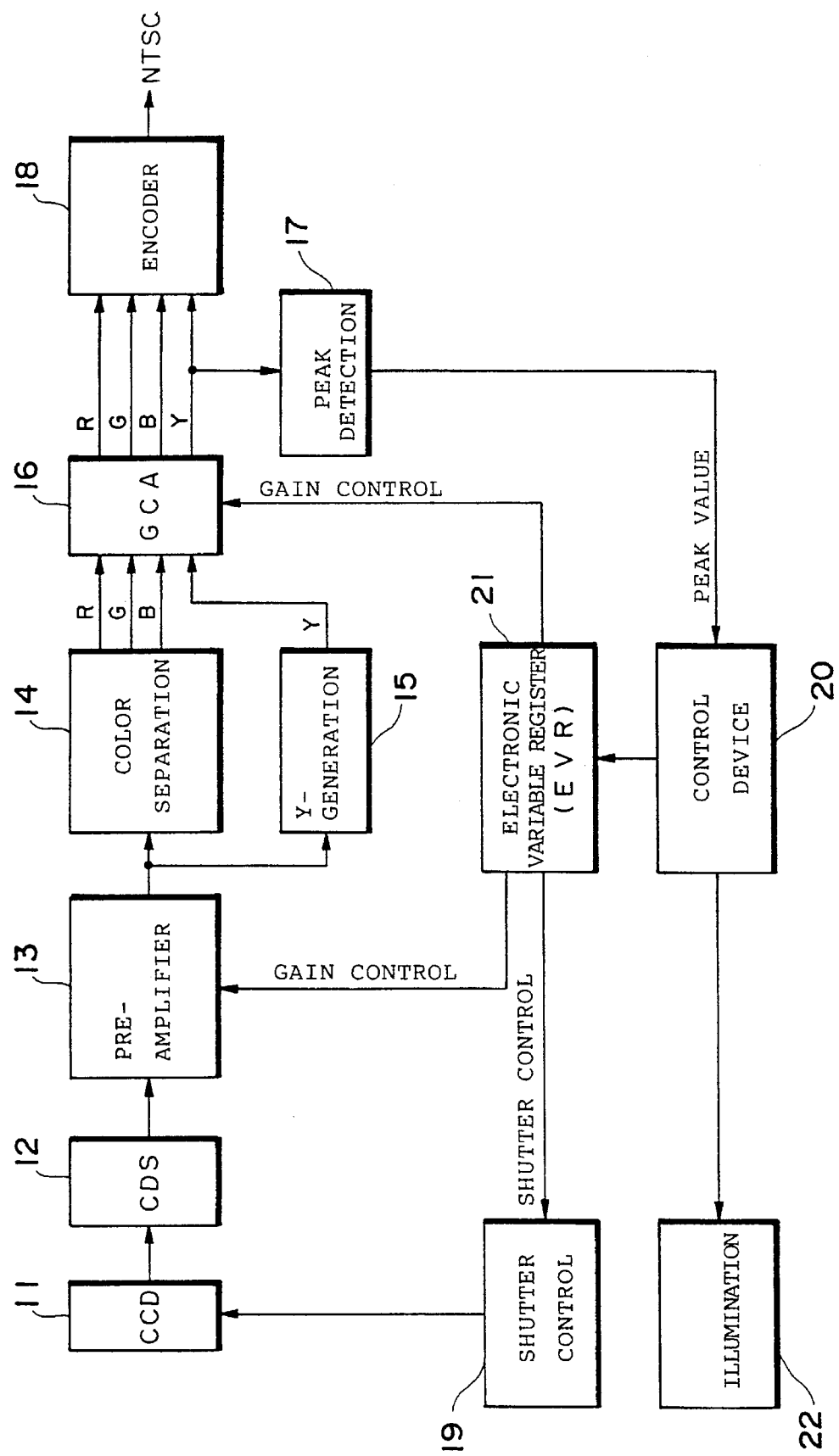
FIG. 1 is a block diagram showing an electrical configuration of an imaging apparatus according to a first embodiment of the present invention.

FIG. 1 is a block diagram showing an electrical configuration of an imaging apparatus for imaging a document to output a video signal representing an image obtained by the imaging according to a first embodiment of the present invention.

The operation of the imaging apparatus is supervised by a control device 20.

The imaging apparatus comprises a CCD (Charge Coupled Device) 11, and its electronic shutter operation is performed by controlling the timing of the start of storage and the time period for storage (accumulation) of charges in the CCD 11. The timing of the start of storage and the time period for storage of charges in the CCD 11 are controlled by a shutter control circuit 19. The imaging apparatus further comprises a pre-amplifier circuit 13 and a GCA (a gain controlled amplifier) 16. Each of the amplifier circuits amplifies a video signal inputted depending on its gain (amplification factor) corresponding to a gain control signal applied. The gain control signal applied to the pre-amplifier circuit 13 is operated mainly when the level of the video signal inputted is changed relatively greatly, and the gain control signal applied to the GCA 16 is operated mainly when the level of the video signal inputted is finely adjusted.

The imaging apparatus comprises an illuminating device 22. When the luminance of a subject is low, the subject to be imaged is illuminated by the illuminating device 22.

The imaging apparatus shown in FIG. 1 is provided with no diaphragm. The video signal is adjusted to an appropriate level by controlling the electronic shutter speed in the CCD 11 and adjusting the level of the video signal using the pre-amplifier circuit 13 and the GCA 16, thereby to achieve exposure control. Particularly when the subject is illuminated using the illuminating device 22, overexposure is liable to be made. However, the video signal is adjusted to a proper level by necessary control out of shutter speed control and gain control.

When it is desired to change the level of the video signal obtained by the imaging relatively greatly, the shutter speed control or the gain control using the pre-amplifier circuit 13 is carried out. The shutter speed cannot be made lower than ⅟₆₀ of a second. When the level of the video signal is further raised, therefore, the level is adjusted using the pre-amplifier circuit 13. Since the level of the signal inputted to the pre-amplifier circuit 13 is low, it is difficult to finely adjust the level. When the level of the video signal must be finely adjusted, therefore, the gain control is carried out using the GCA 16 connected to the succeeding stage of the pre-amplifier circuit 13.

The imaging apparatus comprises an electronic variable register 21, and its output voltage is controlled by the control device 20. The electronic variable register 21 is one type of D/A (digital-to-analog) converter, which outputs an analog voltage signal corresponding to digital data applied from the control device 20. Shutter control signal is applied to the shutter control circuit 19 from the electronic variable register 21, and gain control signals are respectively applied to the pre-amplifier circuit 13 and the GCA 16 from the electronic variable register 21. Consequently, the shutter speed in the CCD 11 is controlled by the shutter control circuit 19, the gain of the pre-amplifier circuit 13 and the gain of the GCA 16 are respectively determined. Although there are provided electronic variable registers respectively corresponding to the pre-amplifier circuit 13, the GCA 16 and the shutter control circuit 19, the plurality of electronic variable registers are represented by one electronic variable register 21 in FIG. 1.

The subject is imaged under the control of the shutter control circuit 19, and a video signal representing an image of the subject imaged is read out from the CCD 11. The video signal outputted from the CCD 11 is applied to the pre-amplifier circuit 13 through a CDS (a correlation double sampling circuit) 12. The video signal inputted to the pre-amplifier circuit 13 is amplified in correspondence with the gain controlled by the gain control signal applied from the electronic variable register 21 and is output.

The video signal outputted from the pre-amplifier circuit 13 is applied to a color separating circuit 14 and a luminance signal generating circuit 15. The video signal is separated into chrominance signals of the three primary colors G (green), R (red) and B (blue) representing the image of the subject by the color separating circuit 14, and is applied to the GCA 16. A luminance signal Y is generated by the luminance signal generating circuit 15, and is applied to the GCA 16.

In the GCA 16, the chrominance signals inputted are subjected to color balance adjustment and the chrominance signals and the luminance signal are amplified, depending on the gain control signal applied from the electronic variable register 21. Although one GCA 16 is illustrated in FIG. 1, four GCAs are actually provided for the three chrominance signals R, G and B and the luminance signal Y so that gain control signals are respectively applied to the GCAs from the electronic variable register 21.

In the GCA 16, each of the chrominance signals is amplified in accordance with an amplification factor corresponding to the ratio for the color balance adjustment so that the color balance is not lost. The chrominance signals and the luminance signal which are subjected to the color balance adjustment and the amplification by the GCA 16 are applied to an encoder 18.

An NTSC video signal is generated in the encoder 18 and is output.

The luminance signal outputted from the GCA 16 is also applied to a peak detecting circuit 17.

The peak detecting circuit 17 is a circuit for detecting a peak level of the luminance signal inputted in a predetermined period (for example, for each 1 V: V is a vertical scanning interval). A peak value detected in the peak detecting circuit 17 is applied to the control device 20.

As described later, the peak value obtained in the peak detecting circuit 17 and a peak value previously set in the control device 20 are compared with each other. If the difference between both the peak values is within the allowable range, the shutter speed and the gain of the pre-amplifier circuit 13 and the gain of the GCA 16 are not altered. On the other hand, if the difference between the peak values is outside the allowable range and within a range smaller than a predetermined value (a value larger than a value representing the allowable range), the gain of the GCA 16 is so adjusted that the difference between the peak values becomes smaller. If the difference between the peak values is larger than the above described predetermined value, either or both of the shutter speed and the gain of the pre-amplifier circuit 13 are adjusted. The above described predetermined value will be determined in consideration of the amplification capabilities of the pre-amplifier circuit 13 and the GCA 16, a balance between input and output signals in each of the circuits, and the like.

Figure 2:
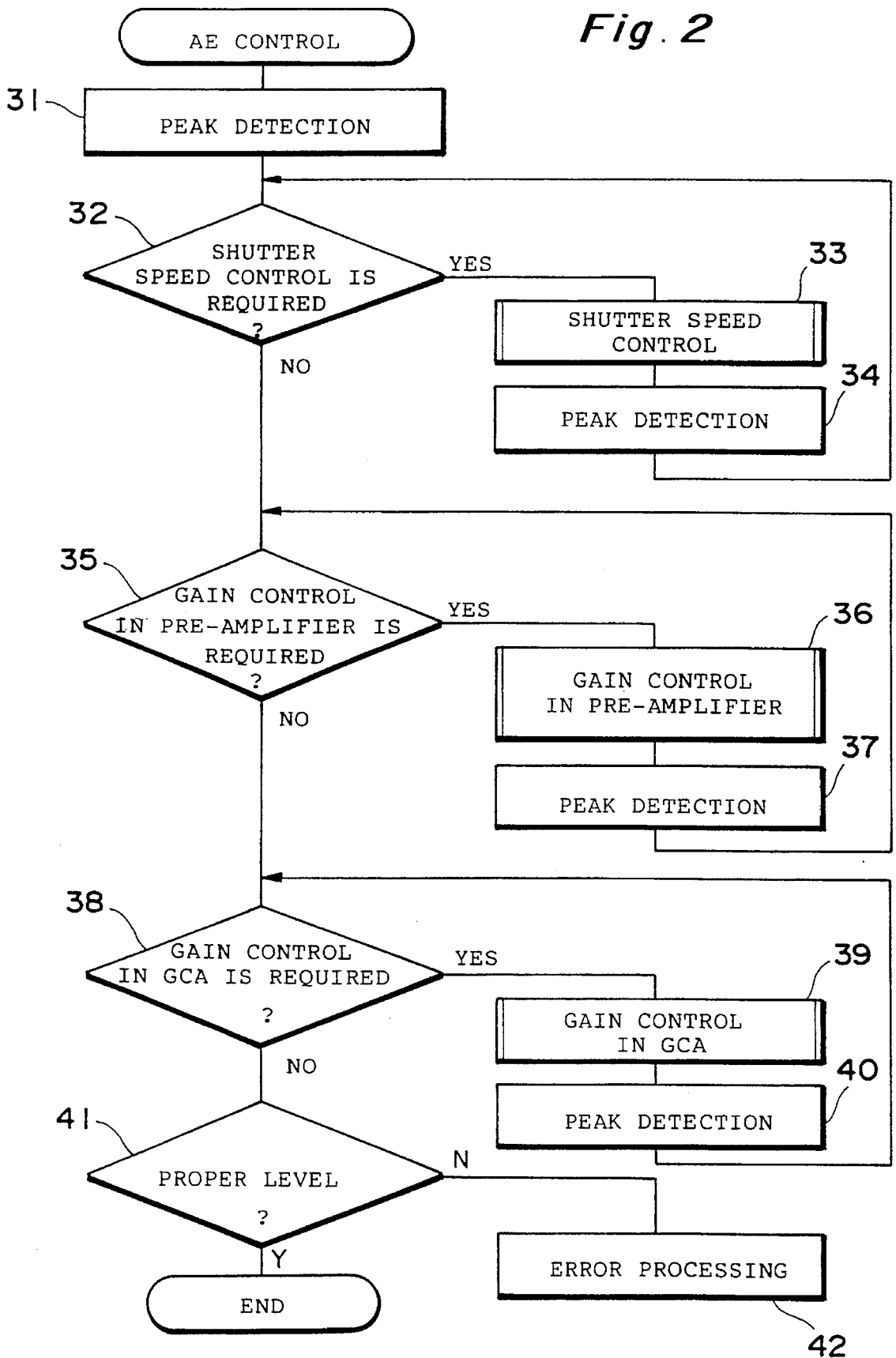
FIG. 2 is a flow chart showing a procedure for adjusting the level of a video signal.

FIG. 2 is a flow chart showing the procedure for such shutter speed and gain adjustment processing, that is, level adjustment processing (AE control) of the video signal obtained by the imaging in the imaging apparatus shown in FIG. 1. This processing is performed mainly by the control device 20. A subject (a document, for example) is imaged by the CCD 11 repeatedly for each 1 V or 2 V.

Peak detection is performed for each 1 V, for example, from the luminance signal obtained by the imaging which is inputted to the peak detecting circuit 17 (step 31). A peak value obtained by the peak detection and a peak value of a video signal having a proper level (the level of the video signal obtained when a chart for adjustment is imaged under the reference brightness) are compared with each other. The peak value of the video signal is previously set in the control device 20. Based on the result of the comparison, it is judged which shutter speed control (step 32), the gain control in the pre-amplifier 13 (step 35) and the gain control in the GCA 16 (step 38) are suitable for bringing the chrominance signals R, G and B and the luminance signal obtained by the imaging into proper levels.

The chart for adjustment includes a white portion, a black portion and a plurality of gray portions whose brightness is gradually changed from white to black. Consequently, the peak value of the video signal having the proper level attains a white peak level or a level close thereto.

When the difference between the peak value obtained by the peak detection and the peak value of a video signal having the proper level is relatively large, the shutter speed control (step 32) or the gain control in the pre-amplifier circuit 13 (step 35) is carried out, or both of them are carried out as required. When the peak value obtained by the peak detection and the peak value having the proper level is large, the shutter speed control (step 32) is first carried out by increasing or decreasing the shutter speed by a predetermined value. However, the shutter speed cannot be lower than 1/60 of a second. The difference between the peak value obtained by the peak detection and the peak value of the video signal having the proper level may, in some cases, be still large if the shutter speed is set to 1/60 of a second. In such cases, the gain of the pre-amplifier circuit 13 is controlled by increasing or decreasing the gain by a predetermined value. When fine adjustment of the video signal obtained by the imaging is sufficient because the difference between the peak value obtained by the peak detection and the peak value of the video signal having the proper level is relatively small, the gain control in the GCA 16 (step 38) is carried out by increasing or decreasing the gain by a predetermined value. In any control, the adjustable range of the video signal is determined by the shutter control capabilities of the CCD 11 and the shutter control circuit 19 and the amplification capabilities of the pre-amplifier circuit 13 and the GCA 16. The control device 20 applies EVR data corresponding to the shutter control signal or the gain control signal to the electronic variable register 21 or alters the EVR data, thereby to achieve the shutter speed control and the gain control.

If it is judged that the shutter speed control is required (step 32), the shutter speed is changed (step 33). The control is so carried out that the shutter speed is increased when the peak level of the video signal obtained by the imaging is larger than the proper peak level, while being decreased when the peak level of the video signal is smaller than the proper peak level. After the shutter speed has been controlled, the peak detection is performed again in the succeeding 1 V time period (step 34) and then, the program is returned to the step 32.

Furthermore, if it is judged that the gain control in the pre-amplifier circuit 13 is required (step 35), the gain of the pre-amplifier circuit 13 is controlled (step 36). Consequently, the gain of the pre-amplifier circuit 13 is changed, so that the peak level of the video signal obtained by the imaging approaches a proper peak level. After the control of the gain of the pre-amplifier circuit 13 has been terminated, the peak detection is performed again in the succeeding 1 V time period (step 37) and then, the program is returned to the step 35.

If it is judged that the video signal must be finely adjusted by the GCA 16 (step 38), the gain control signal applied to the GCA 16 is changed, so that the gain of the GCA 16 is controlled (step 39). The peak detection is performed again in the succeeding 1 V time period (step 40) and then, the program is returned to the step 38.

Necessary processing of the the shutter speed control, the gain control in the pre-amplifier circuit 13 and the gain control in the GCA 16 is thus performed, so that the peak level of the video signal obtained by the imaging converges at the peak level of the video signal having the proper level.

If the difference between the peak value of the video signal obtained by the imaging and the peak value of the video signal having the proper level becomes smaller than a predetermined value, it is judged that the peak level converges at the proper level (YES at step 41), and the adjustment processing is terminated. An image properly exposed is displayed on a television screen. When the peak level does not converge at the proper level even by any control (NO at step 41), it is reported to an operator that an error occurred (step 42). The error has will be reported by a display, a buzzer or the like provided in the imaging apparatus.

Second Embodiment

Figure 3:
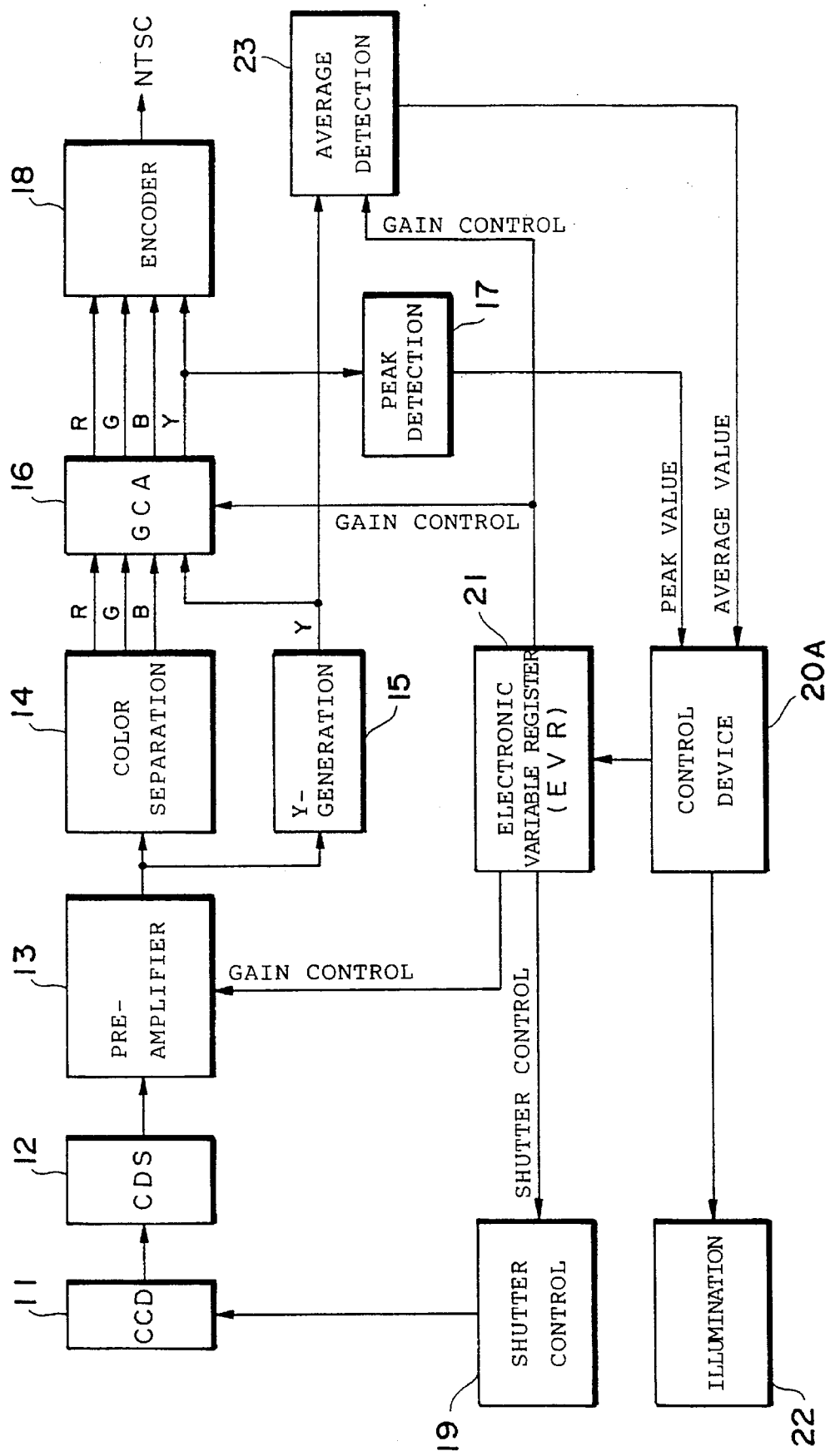
FIG. 3 is a block diagram showing the electrical configuration of an imaging apparatus according to a second embodiment of the present invention.

FIG. 3 is a block diagram showing the electrical configuration of an imaging apparatus according to a second embodiment of the present invention.

In FIG. 3, the same circuit blocks as those shown in FIG. 1 are assigned the same reference numerals and hence, the description thereof is omitted.

In the imaging apparatus shown in FIG. 1, the shutter speed control or the gain control is so carried out that the level of the video signal outputted from the CCD 11 becomes proper on the basis of the peak value obtained from the peak detecting circuit 17. In the case of imaging a subject having an extremely bright portion, the peak value of the video signal rises more sharply than those in other portions. If the level of the video signal is adjusted on the basis of only the peak value, therefore, the entire image is liable to be dark.

The imaging apparatus shown in FIG. 3 is an improvement over the imaging apparatus according to the first embodiment in order to solve such a problem.

The imaging apparatus shown in FIG. 3 differs from the imaging apparatus shown in FIG. 1 in that an average value detecting circuit 23 is added.

The average value detecting circuit 23 is a circuit having as an input a luminance signal generated in a luminance signal generating circuit 15 for integrating the luminance signal within an imaging area of one image to detect the average value of the luminance signal in a predetermined period (for example, for each 1V time period). A signal representing the average value detected in the average value detecting circuit 23 is applied to a control device 20A.

Also in the average value detecting circuit 23, the luminance signal is amplified depending on the same gain as that of the GCA 16. The luminance signal inputted to the average value detecting circuit 23 is amplified depending on a gain control signal applied from an electronic variable register 21, and the average value of the amplified luminance signal is detected. Consequently, a luminance signal whose peak value is detected by a peak detecting circuit 17 and the luminance signal whose average value is detected by the average value detecting circuit 23 are equal in level to each other.

In the imaging apparatus shown in FIG. 3, the level adjustment processing (AE processing) of a video signal is performed under the control of the control device 20A depending on the difference between the peak value of the luminance signal and the average value of the luminance signal, and on the basis of the peak value, the average value or a value obtained by considering both the peak value and the average value.

Figure 4:
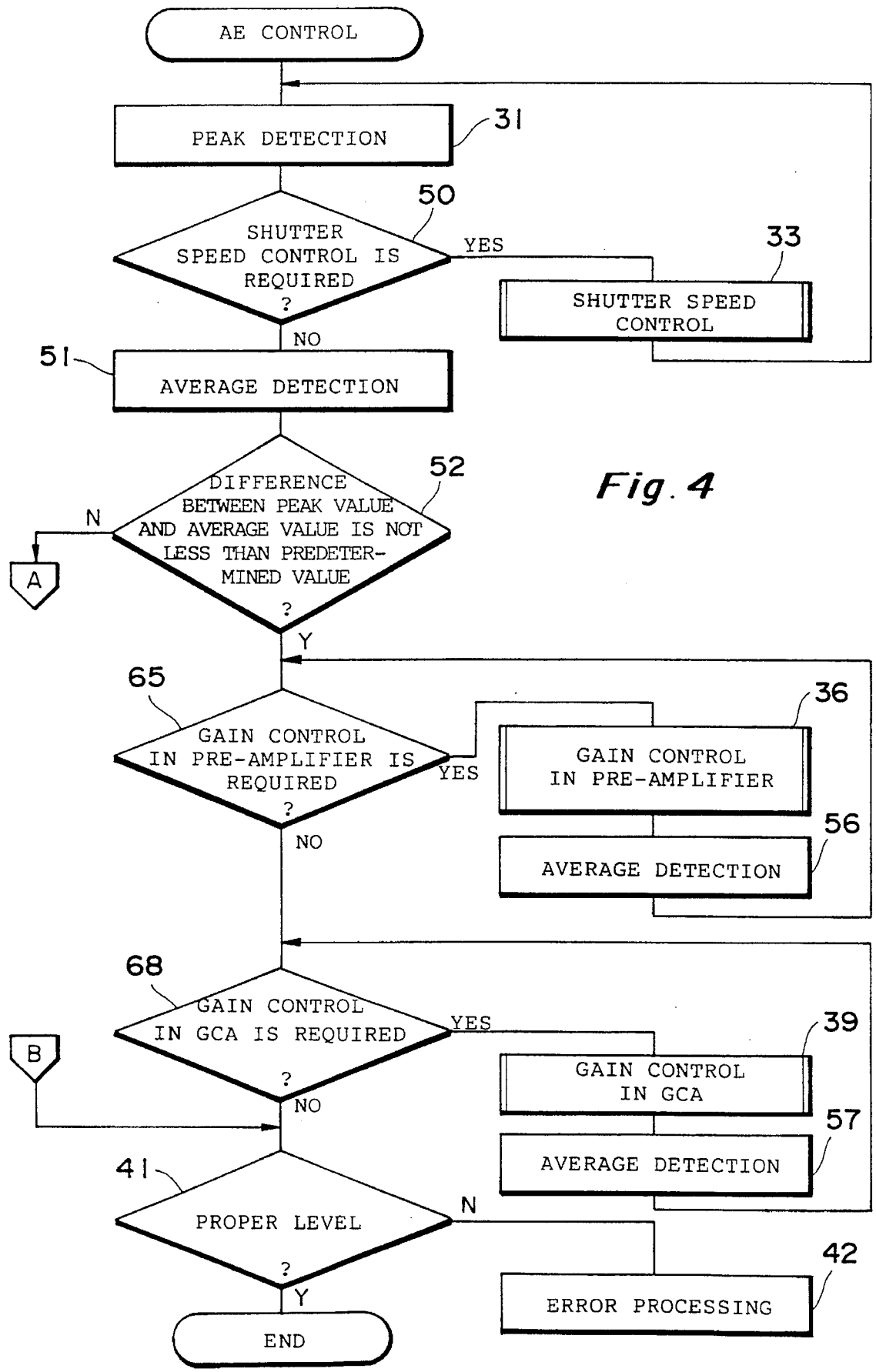
FIG. 4 is a flow chart showing a procedure for adjusting the level of a video signal.
Figure 5:
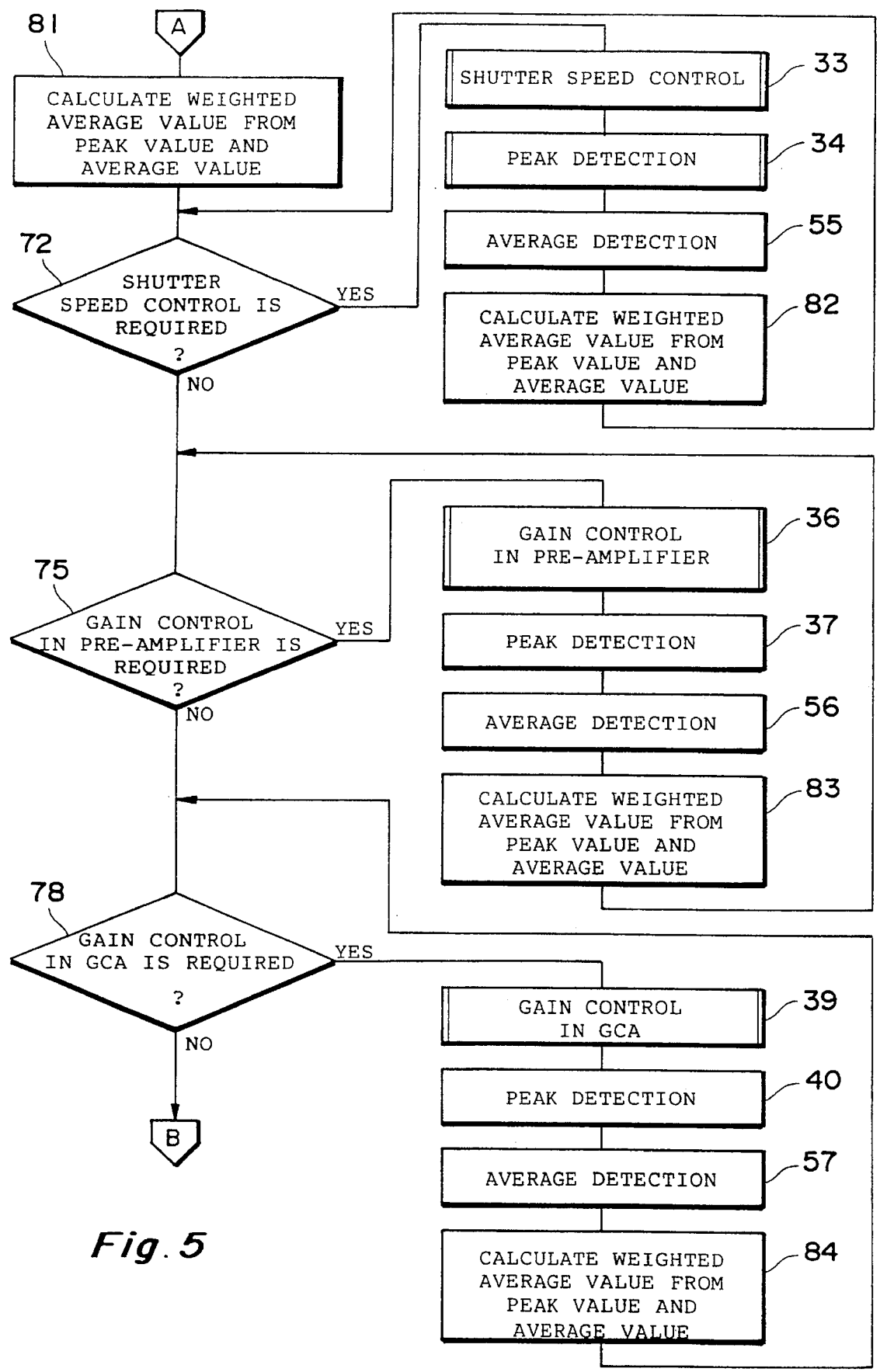
FIG. 5 is a flow chart showing a procedure for adjusting the level of a video signal.

FIGS. 4 and 5 are flow charts showing the procedure for processing in a case where AE control is carried out using the imaging apparatus shown in FIG. 3. This processing is performed mainly by the control device 20A. In FIGS. 4 and 5, the same processing blocks as those shown in FIG. 2 are assigned the same reference numerals.

The peak value of the luminance signal is obtained in the peak detecting circuit 17 (step 31).

It is judged whether or not the shutter speed control is required on the basis of the peak value of the luminance signal (step 50). When the peak value of the luminance signal is large so that a signal portion of the peak of the video signal is saturated, the shutter speed control is carried out so that the shutter speed is increased (steps 50 and 33).

When the signal portion of the peak of the video signal is not saturated, the shutter speed control is not performed, and the average value of the luminance signal corresponding to one image is detected in the average value detecting circuit 23 (step 51).

It is then judged whether or not the obtained peak value is larger than the average value and the difference therebetween is not less than a predetermined value (step 52). For example, when the peak value of the video signal obtained by imaging is much larger than the peak value of a video signal having a proper level (for example, not less than three to four times), and the peak value of the video signal obtained by the imaging is not less than two times the average value of the video signal, it is judged that the difference between the peak value and the average value is not less than the predetermined value. The video signal having the proper level is a video signal obtained when a chart for adjustment is imaged under the reference brightness, as described above.

If it is judged that the difference between the peak value and the average value is not less than the predetermined value (YES at step 52), the average value obtained by the average value detecting circuit 23 and the average value of the video signal having the proper level are compared with each other. The average value having the proper level is also previously set in the control device 20A. Based on the result of the comparison, it is judged which gain control in a pre-amplifier 13 (step 65) and gain control in a GCA 16 (step 68) are suitable for bringing chrominance signals R, G and B and the luminance signal obtained by the imaging into proper levels.

If the difference between both the average values is relatively large, the gain control in the pre-amplifier circuit 13 (step 36) is carried out. Thereafter, average value detection processing is performed again (step 56) and then, the program is returned to the step 65.

If it is judged that the level of the video signal must be finely adjusted by the GCA 16 because the difference between the average values is relatively small (step 68), the gain control in the GCA 16 is carried out (step 39). Thereafter, the average value detection processing is performed again (step 57) and then, the program is returned to the step 68.

The AE control processing is thus performed on the basis of the difference between the average values until it is judged that the video signal obtained by the imaging attains the proper level (step 41). Specifically, if the difference between the average value of the video signal obtained by the imaging and the average value of the video signal having the proper level is within the allowable range, it is judged that the video signal obtained by the imaging is at the proper level. The processing is terminated if the video signal is at the proper level, whereas the error processing is performed if it is not at the proper level, similarly to the processing shown in FIG. 2 (step 42).

When the peak value is larger than the average value, and the difference therebetween is not less than the predetermined value, the AE control is carried out on the basis of the average value, even when a subject including an extremely bright portion, is imaged where the peak of the video signal rises more sharply than those in the other portions. Therefore, it is possible to obtain an image having proper brightness throughout the video signal except in its peak portion.

When the difference between the peak value and the average value is smaller than the predetermined value (NO at step 52), the AE control is carried out in consideration of both the peak value and the average value. More specifically, the AE control is carried out using a value obtained by calculating the weighted average of the peak value and the average value at a predetermined ratio (for example, at a ratio of 4 : 6) (step 81).

A weighted average value in the video signal obtained by imaging the subject and a weighted average value in the video signal having the proper level (this weighted average value being previously set in the control device 20A) are compared with each other. From the result of the comparison, it is judged which shutter speed control (step 72), gain control in the pre-amplifier circuit 13 (step 75) and gain control in the GCA 16 (step 78) are favorable for the video signal obtained by imaging the subject to approach the proper level. If the difference between the two weighted average values is large, the shutter speed control (step 72) or the gain control in the pre-amplifier circuit 13 (step 75) is carried out (both of them are carried out, as required), as in the above described embodiment. On the other hand, if the difference between the two weighted average values is small and is outside the allowable range, the gain control in the GCA 16 is carried out (step 78) .

If the difference between the two weighted average values is larger than a predetermined value, and the shutter speed control is possible (the shutter speed does not reach ⅟₆₀ of a second in a case where the shutter speed must be decreased), processing for the shutter speed control is first performed (step 33). Subsequently, peak detection (step 34) and average detection (step 55) are performed so as to calculate a weighted average value.

A weighted average value of a peak value and an average value respectively obtained in the peak detection (step 34) and the average detection (step 55) is calculated, for example, at a ratio of 4 : 6 (step 82).

It is judged again whether or not the shutter speed control is required on the basis of the weighted average value obtained (step 72).

When the difference between the weighted average values is large, and the shutter speed becomes ⅟₆₀ of a second and cannot be made lower than ⅟₆₀ of a second (when the shutter speed must be further decreased), the gain control in the pre-amplifier circuit 13 is carried out (steps 75 and 36). Thereafter, peak detection (step 37) and average detection (step 56) are performed, to detect a peak value and an average value. A weighted average value of the detected peak value and average value is calculated (step 83) and then, the program is returned to the step If the difference between the weighted average value calculated and the weighted average value obtained on the basis of the video signal having the proper level is still large, the gain control in the pre-amplifier circuit 13 is required again.

If the difference between the weighted average values is small and has not fallen in the allowable range yet, the gain control in the GCA 16 is carried out (steps 78 and 39). Thereafter, peak detection (step 40) and average detection (step 57) are performed. A weighted average value of a peak value and an average value obtained is calculated again (step 84) and then, the program is returned to the step 78.

If the difference between the weighted average value in the video signal and the weighted average value in the video signal having the proper level is within the allowable range, the AE control is terminated (step 41).

As described in the foregoing, although the gain control in the pre-amplifier circuit 13 or the GCA 16 is carried out on the basis of the average value (steps 36 and 39) when the difference between the peak value and the average value is not less than the predetermined value (YES in step 52), the shutter speed control may be added thereto.

When the difference between the peak value and the average value is less than the predetermined level (NO at step 52), it is considered that the subject includes no extremly bright portion. Accordingly, AE control based on the peak value may be carried out, as in the first embodiment shown in FIGS. 1 and 2.

Third Embodiment

Figure 6:
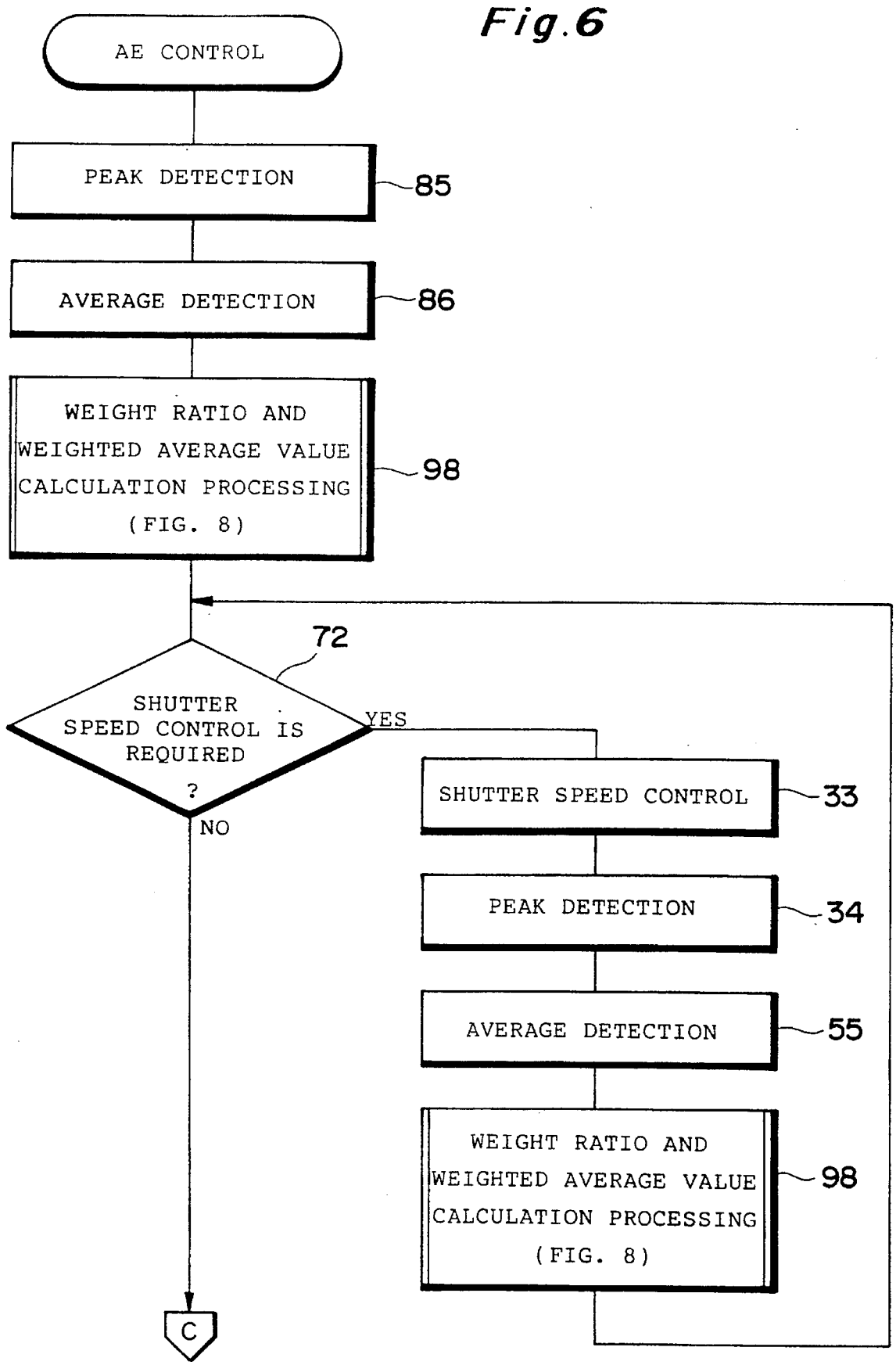
FIG. 6 is a flow chart showing a procedure for adjusting the level of a video signal according to a third embodiment of the present invention.
Figure 7:
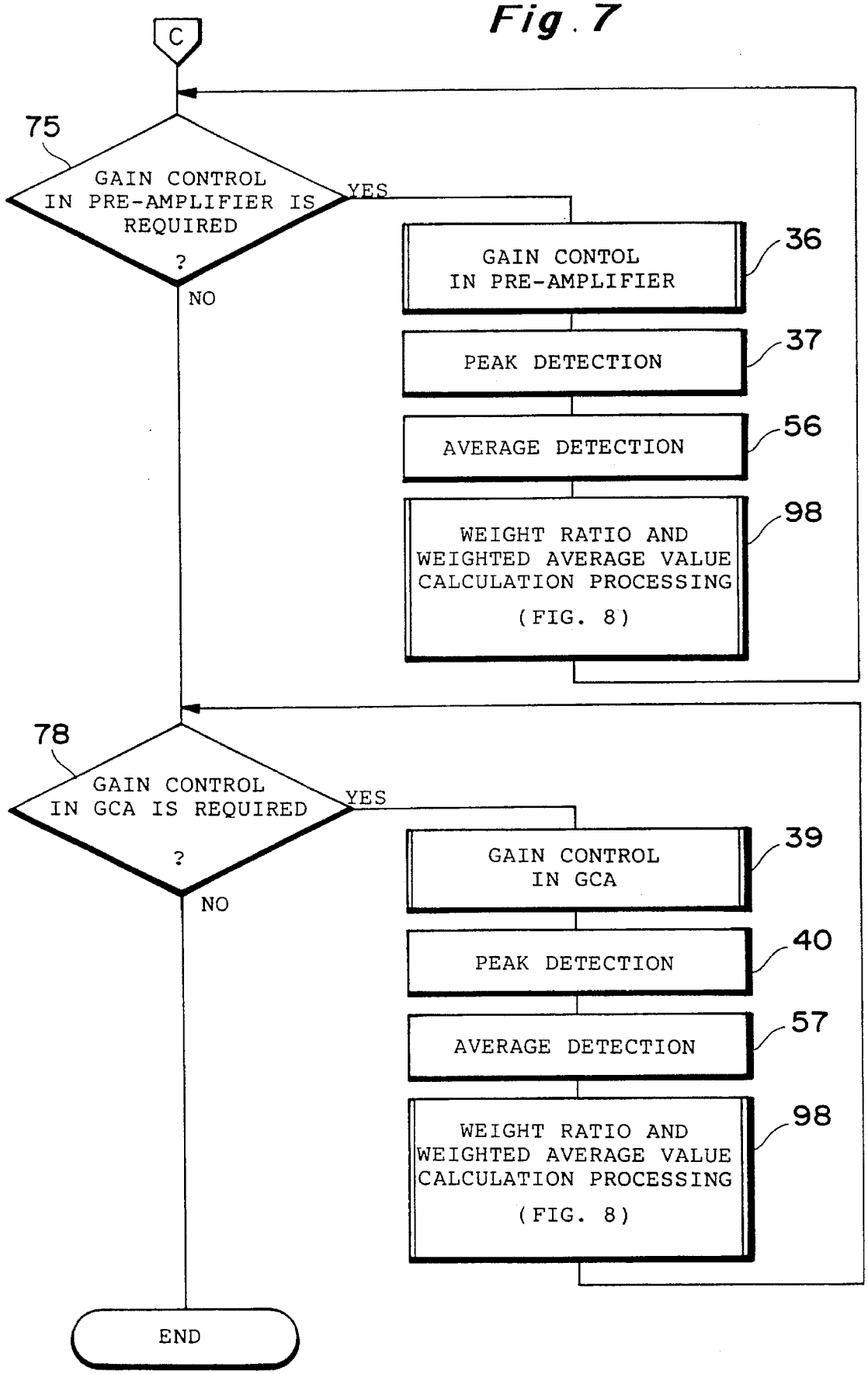
FIG. 7 is a flow chart showing a procedure for adjusting the level of a video signal.

FIGS. 6 and 7 show a third embodiment. The configuration of the imaging apparatus shown in FIG. 3 is applicable without any modification.

In the AE control processing shown in FIGS. 4 and 5 (the second embodiment), the peak detection and the average detection are performed. When the difference between the obtained peak value and average value is not more than the predetermined value, the weighted average of the peak value and the average value is calculated at the ratio of 4 : 6, and the shutter speed control and the gain control are carried out on the basis of a weighted average value obtained (step 81 and the subsequent steps in FIG. 5).

On the other hand, in AE control processing according to the third embodiment, a weight ratio Y corresponding to the ratio of weights acting on an average value and a peak value so for calculating a weighted average value, is determined depending on the difference between the peak value and the average value, and the weighted average of the peak value and the average value is calculated by the determined weight ratio Y. Shutter speed control and gain control are carried out on the basis of a weighted average value obtained.

Figure 9:
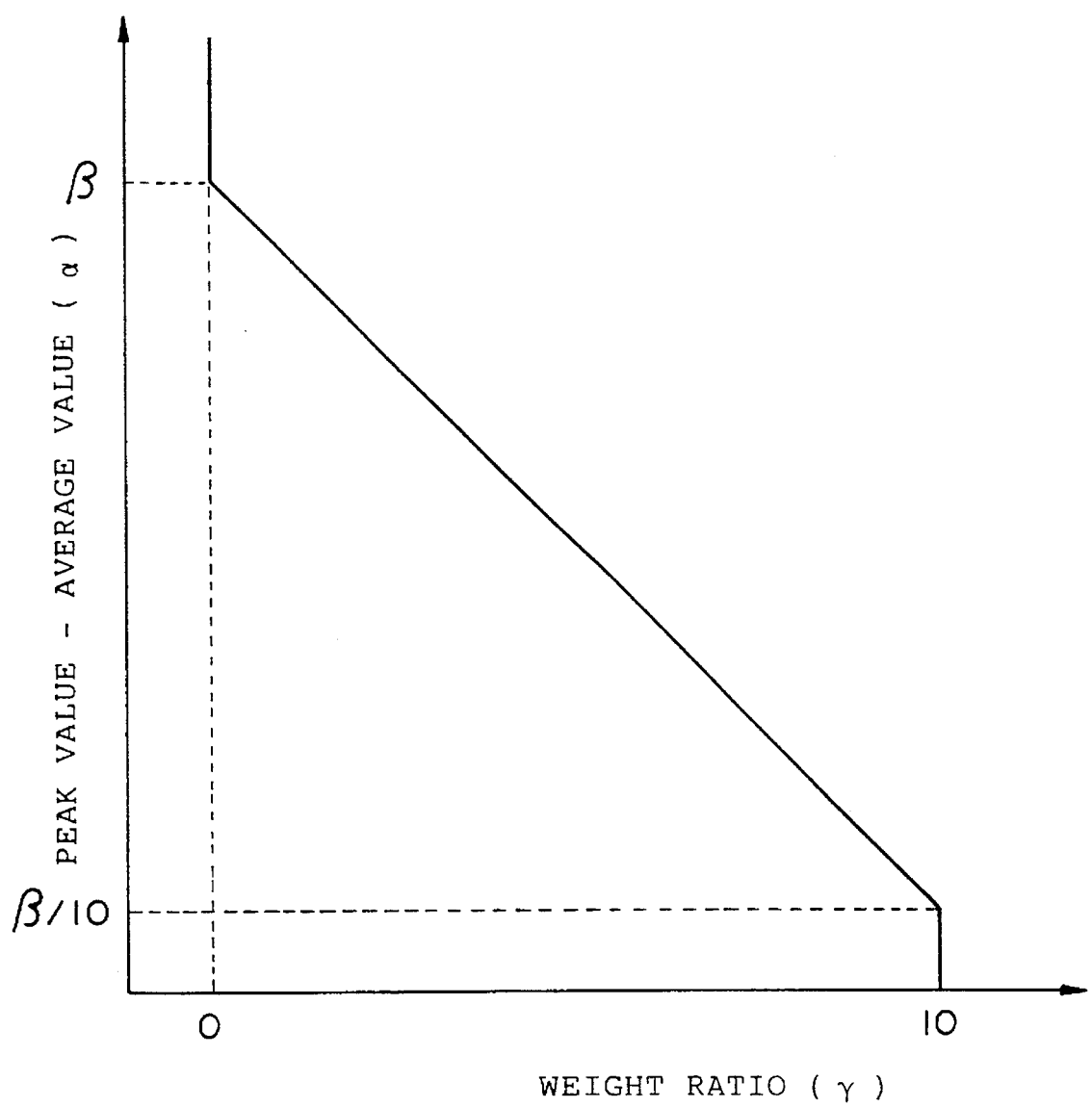
FIG. 9 is a graph showing a relationship between a level difference between a peak value and an average value and a weight ratio.

Although the weight ratio Y can be defined in various forms, it is defined herein as a value which is changed in the range of 0 to 10 as shown in a graph of FIG. 9 depending on a difference α between the peak value and the average value. A weighted average value is calculated by the following equation using the weight ratio Y and the difference α between the peak value and the average value:

$$\text{Weighted average value} = \text{Average value} + Y \times \alpha/10 \quad (1)$$

In FIG. 9, if an image obtained by imaging a subject includes no extremly bright portion and the brightness thereof is approximately the same throughout, the weight ratio Y takes a large value. Specifically, the smaller the difference α between the peak value and the average value is, the larger the weight ratio Y is. On the other hand, if the the difference α between the peak value and the average value is large because the image of the subject includes an extremly bright portion, the weight ratio Y takes a small value. When the weight ratio Y is large, the effect of the peak value on the weighted average value is increased. The maximum value of the weight ratio Y is set to 10. When the weight ratio Y is 10, the weighted average value becomes an average value between the average value and the peak value. When the weight ratio Y is small, that is, the image of the subject includes an extremly bright portion, the weighted average value approaches the average value. When the difference between the peak value and the average value becomes a certain value β, the weight ratio Y becomes zero. This value β represents the difference between the peak value and the average value under the situation where the proper AE control cannot be carried out if the peak value affects the weighted average value even slightly, since the image of the subject includes an extremly bright portion. Specifically, the difference between the peak value and the average value obtained when a chart for adjustment is imaged is adopted as β. Although the chart for adjustment is as described above, the details thereof will be described later.

Figure 8:
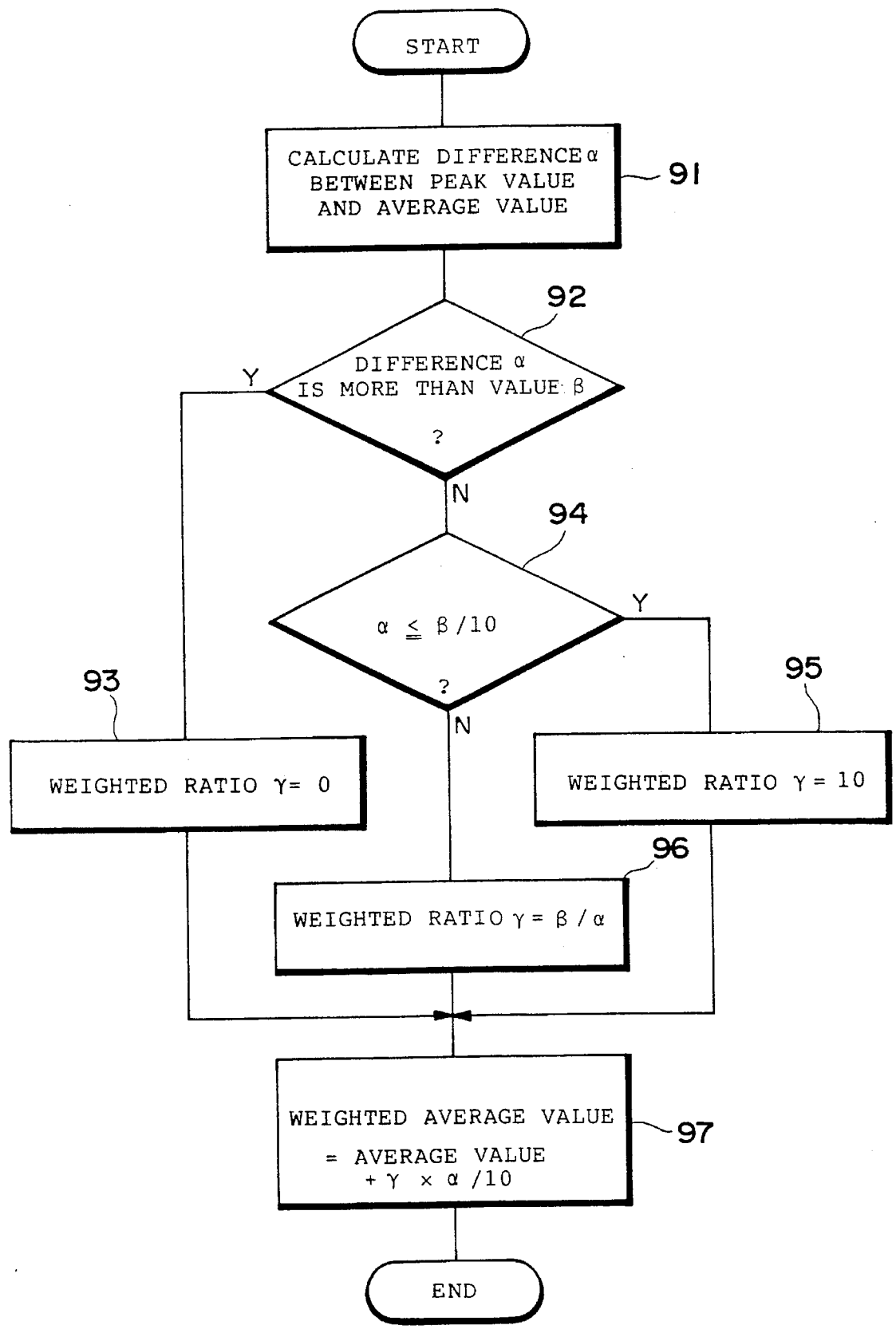
FIG. 8 is a flow chart showing a procedure for calculating a weight ratio and a weighted average value.

Referring to FIG. 8, description is now made of a weight ratio calculation processing and a weighted average value calculation processing.

The difference α between the peak value and the average value which are applied to a control device 20A is first calculated (step 91).

It is then judged whether or not the calculated difference α is larger than the above described value β (step 92). The value β is previously stored in the control device 20A.

When the calculated difference α is larger than the value β, it is judged that the image of the subject includes an extremly bright portion, so that the peak of the video signal obtained by the imaging rises sharply. In such a case, the peak value may be ignored to control the brightness of the image on the basis of the average value. Accordingly, the weight ratio Y is set to zero (step 93), and the weighted average value is equal to the average value from the equation (1) (step 97).

When the calculated difference α is not more than the value β (NO at step 92), it is judged whether the calculated difference α is not more than β/10 (step 94). A numerical value 10 by which the value β is divided, is determined in consideration of the precision or the like of an analog-to-digital converter circuit included in the control device 20A, which may be replaced with another numerical value.

When the difference α is not more than β/10 (YES at step 94), the difference α between the detected peak value and average value is small. Therefore, the weight ratio Y is set to 10 (step 95), and the weighted average value is equal to the average of the peak value and the average value from the equation (1) (step 97).

When the difference α is more than β/10 (NO at step 94), the weight ratio Y is calculated using the following equation (2) (step 95), and the weighted average value is calculated from the equation (1) using this weight ratio Y.

$$\text{Weight ratio } (Y) = \beta/\alpha \quad (2)$$

Description is made of the AE control processing based on the procedure shown in FIGS. 6 and 7.

The processing shown in FIG. 6 and FIG. 7 is approximately the same as the processing shown in FIG. 5 except for the weighted average value calculation processing. In FIGS. 6 and 7, therefore, the same processing blocks as those shown in FIG. 5 are assigned the same reference numerals as those shown in FIG. 5.

Although the steps for controlling a shutter speed so that a signal portion of the peak of the video signal is not saturated are not illustrated in FIGS. 6 and 7, it goes without saying that such steps for controlling a shutter speed may be performed so that the signal portion of the peak of the video signal is not saturated, similar to the the steps 31, 50 and 33 shown in FIG. 4.

First, the peak value of a luminance signal detected in a peak detecting circuit 17 (step 85) and an average value detected in an average value detecting circuit 23 (step 86) are respectively applied to the control device 20A. A weight ratio Y is calculated from the peak value and the average value which are applied to the control device 20A, and a weighted average value is calculated from the equation (1) using the weight ratio Y calculated (step 98). This is performed in accordance with the flow chart shown in FIG. 8, as described above.

The weighted average value calculated is compared with a value obtained by calculating the weighted average of a peak value and an average value of a video signal having a proper level at the ratio of 4 : 6.

The video signal having the proper level is a video signal obtained when the chart for adjustment is imaged under the reference brightness, as described above. The chart for adjustment includes a white portion, a black portion and a plurality of gray portions whose brightness is gradually changed, as described above. Since the peak value attains a white peak level or a level significantly close thereto, and the average value attains an approximately intermediate level between the white peak level and a black peak level, a value obtained by calculating the weighted average of the peak value and the average value at the ratio of 4 : 6 is positioned at a level between the white peak level and the intermediate level.

When the difference between the weighted average value calculated and the weighted average value obtained from the video signal having the proper level is large, the shutter speed is first controlled in such a direction so that the difference is decreased (steps 72 and 33). The peak detection and the average detection are performed again (steps 34 and 55), the weight ratio Y and the weighted average value are calculated (step 98) and then, the program is returned to the step 72.

When the difference between the weighted average value in the video signal obtained by the imaging and the weighted average value in the video signal having the proper level is still large even after the shutter speed is once controlled, the shutter speed is controlled again. When the shutter speed is to be further decreased and the shutter speed has been already set to 1/60 of a second, the shutter speed cannot be further decreased. At this time, gain control in a pre-amplifier circuit 13 is carried out (steps 75 and 36). Thereafter, the peak detection and the average detection are performed again (steps 37 and 56), the weight ratio Y and the weighted average value are calculated (step 98) and then, the program is returned to the step 75.

If the difference between the weighted average value calculated and the weighted average value obtained on the basis of the video signal having the proper level is still large, the gain control in the pre-amplifier circuit 13 is required again. When the difference between the weighted average values is small but has not fallen in the proper range yet, gain control in a GCA 16 is carried out (steps 78 and 39), If the gain control in the GCA 16 is carried out, then the peak detection (step 40) and the average detection (step 57) are performed again to calculate a weight ratio. The weight ratio and the weighted average value are calculated from a peak value and an average value obtained (step 98).

The processing at the steps 78, 39, 40, 57 and 98 is repeated until the difference between the weighted average value in the video signal and the weighted average value in the video signal having the proper level is within the allowable range. If the difference between the weighted average value in the video signal obtained by imaging and the weighted average value in the video signal having the proper level falls in the allowable range, the AE control processing is terminated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An imaging apparatus comprising:

shutter means in which a shutter speed is variable;

imaging means for imaging a subject under exposure conditions realized by said shutter means to output a video signal representing an image of the subject;

amplifying means for amplifying the video signal outputted from said imaging means;

a peak detecting circuit for performing peak detection of the video signal outputted from said imaging means;

an average level detecting circuit for detecting an average level of the video signal outputted from said imaging means;

first level difference detecting means for detecting a first peak level difference between a peak level obtained by said peak detecting circuit and a proper peak level;

shutter controlling means for controlling said shutter means so that said first peak level difference becomes small;

second level difference detecting means for detecting a second level difference between the peak level obtained by said peak detecting circuit and the average level obtained by said average level detecting circuit; and controlling means for carrying out at least one of shutter speed control in said shutter means and gain control in said amplifying means so that said detected average level approaches a proper average level when the second level difference detected by said second level difference detecting means exceeds a reference value, while carrying out at least one of the shutter speed control in said shutter means and the gain control in said amplifying means so that at least said detected peak level approaches said proper peak level when the second level difference detected by said second level difference detecting means is not more than said reference value.

2. The imaging apparatus according to claim 1, wherein said amplifying means comprises a first amplifier circuit for amplifying the video signal outputted from said imaging means and a second amplifier circuit for finely adjusting the level of the video signal outputted from said first amplifier circuit, said controlling means carrying out gain control in said first amplifier circuit when at least one of a difference between said detected average level and the proper average level, and the difference between said peak level and the proper peak level is large, while carrying out gain control in said second amplifier circuit when the difference is small.

3. An image apparatus comprising:

shutter means in which a shutter speed is variable;

imaging means for imaging a subject under exposure conditions realized by said shutter means to output a video signal representing an image of the subject;

amplifying means for amplifying the video signal outputted from said imaging means;

a peak detecting circuit for performing peak detection of the video signal outputted from said imaging means;

an average level detecting circuit for detecting an average level of the video signal outputted from said imaging means;

level difference detecting means for detecting a level difference between a peak level obtained by said peak detecting circuit and the average level obtained by said average level detecting circuit; and controlling means for carrying out shutter speed control in said shutter means and gain control in said amplifying means so that said detected average level approaches a proper average level, when the level difference detected by said level difference detecting means exceeds a reference value.

4. The imaging apparatus according to claim 3, wherein said amplifying means comprises a first amplifier circuit for amplifying the video signal outputted from said imaging means and a second amplifier circuit for finely adjusting the level of the video signal outputted from said first amplifier circuit, said controlling means carrying out gain control in said first amplifier circuit when a difference between said detected average level and the proper average level is large, while carrying out gain control in said second amplifier circuit when said difference between the average levels is small.

5. The imaging apparatus according to claim 3, further comprising weighted average level calculating means for calculating a weighted average level of the peak level obtained by said peak detecting circuit and the average level obtained by said average level detecting circuit at a predetermined ratio, said controlling means carrying out at least one of the shutter speed control in said shutter means and the gain control in said amplifying means so that the weighted average level obtained by said weighted average level calculating means approaches a proper weighted average level when the level difference detected by said level difference detecting means is not more than said reference value.

6. The imaging apparatus according to claim 3, wherein said controlling means carries out at least one of the shutter speed control in said shutter means and the gain control in said amplifying means so that the peak level obtained by said peak detecting circuit becomes a proper peak level, when the level difference detected by said level difference detecting means is not more than said reference value.

7. The imaging apparatus according to claim 3, further comprising weighted average level calculating means for calculating a weighted average level of the peak level obtained by said peak detecting circuit and the average level obtained by said average level detecting circuit at a predetermined ratio, said controlling means carrying out at least one of the shutter speed control in said shutter means and the gain control in said amplifying means so that at least one of the weighted average level and the peak level obtained by said peak detecting circuit approaches corresponding one of a proper weighted average level and a proper peak level, when said level difference detected by said level difference detecting means is not more than said reference value.

8. The imaging apparatus according to claim 3, further comprising:

peak level difference detecting means for detecting a peak level difference between the peak level obtained by said peak detecting circuit and a proper peak level; and shutter controlling means for controlling said shutter means so that said peak level difference becomes smaller.

9. The imaging apparatus according to claim 3, wherein said controlling means carries out both the shutter speed control and the gain control, when the level difference detected by said difference detecting means exceed the reference value.

10. An imaging apparatus comprising:

shutter means in which a shutter speed is variable;

imaging means for imaging a subject under exposure conditions realized by said shutter means to output a video signal representing an image of the subject;

amplifying means for amplifying the video signal outputted from said imaging means;

a peak detecting circuit for detecting a peak level of the video signal outputted from said imaging means;

an average level detecting circuit for detecting an average level of the video signal outputted from said imaging means;

weight ratio determining means for determining a weight ratio so that the larger a level difference between the peak level detected by said peak detecting circuit and the average level detected by said average level detecting circuit is, the larger the weight ratio is, whereas the smaller the level difference is, the smaller the weight ratio is;

weighted average level calculating means for calculating a weighted average level of the detected peak level and the detected average level using the weight ratio determined by said weight ratio determining means; and controlling means for carrying out shutter speed control in said shutter means and gain control in said amplifying means so that the weighted average level calculated by said weighted average level calculating means approaches a proper weighted average level.

11. The imaging apparatus according to claim 10, wherein said amplifying means comprises a first amplifier circuit for amplifying the video signal outputted from said imaging means and a second amplifier circuit for finely adjusting the level of the video signal outputted from said first amplifier circuit, said controlling means carrying out the gain control in said first amplifier circuit when a level difference between said calculated weighted average level and the proper weighted average level is large, while carrying out the gain control in said second amplifier circuit when said level difference is small.

12. The imaging apparatus according to claim 10, further comprising illuminating means for illuminating the subject, said imaging means imaging the subject illuminated by said illuminating means.

13. The imaging apparatus according to claim 10, wherein said controlling means carries out both the shutter speed control and the gain control so that the calculated weighted average level approaches the proper weighted average level.

14. In an imaging apparatus comprising an electronic shutter in which a shutter speed is controlled, an imaging device for imaging a subject under exposure conditions realized by said electronic shutter to output a video signal representing an image of the subject, and an amplifier circuit for amplifying the video signal outputted from said imaging device, a method of controlling the imaging apparatus comprising the steps of:

detecting a peak level and an average level of the video signal outputted from said imaging device;

detecting a first peak level difference between the detected peak level and a proper peak level, and a second level difference between the detected peak level and the detected average level;

controlling the shutter speed in said electronic shutter so that the first peak level difference becomes small; and carrying out at least one of the shutter speed control in said electronic shutter and gain control in said amplifier circuit so that said detected average level approaches a proper average level when said second level difference exceeds a reference value, while carrying out at least one of the shutter speed control and the gain control so that at least said detected peak level approaches the proper peak level, when the second level difference is not more than said reference value.

15. The method according to claim 14, wherein said amplifier circuit comprises a first amplifier circuit for amplifying the video signal outputted from said imaging device and a second amplifier circuit for finely adjusting the level of the video signal outputted from said first amplifier circuit, said method further comprising:
carrying out gain control in said first amplifier circuit when at least one of a difference between said average level and the proper average level and the difference between said peak level and the proper peak level is large, while carrying out gain control in said second amplifier circuit when said difference is small.

16. In an imaging apparatus comprising an electronic shutter in which a shutter speed is controlled, an imaging device for imaging a subject under exposure conditions realized by said electronic shutter to output a video signal representing an image of the subject, and an amplifier circuit for amplifying the video signal outputted from said imaging device, a method of controlling the imaging apparatus comprising the steps of:
detecting a peak level and an average level of the video signal outputted from the imaging device;
detecting a level difference between the detected peak level and the detected average level; and
carrying out shutter speed control in said electronic shutter and gain control in said amplifier circuit so that said detected average level approaches a proper average level when said level difference exceeds a reference value.

17. The method according to claim 16, wherein said amplifier circuit comprises a first amplifier circuit for amplifying the video signal outputted from said imaging device and a second amplifier circuit for finely adjusting the level of the video signal outputted from said first amplifier circuit, said method further comprising:
carrying out gain control in said first amplifier circuit when a difference between the detected average level and the proper average level is large, while carrying out the gain control in said second amplifier circuit when said difference between the average levels is small.

18. The method according to claim 16, further comprising:

calculating a weighted average level of the detected peak level and the detected average level at a predetermined ratio; and carrying out at least one of the shutter speed control in said electronic shutter and the gain control in said amplifier circuit so that said weighted average level approaches a proper weighted average level when said level difference is not more than said reference value.

19. The method according to claim 16, further comprising:

carrying out at least one of the shutter speed control in said electronic shutter and the gain control in said amplifier circuit so that the detected peak level becomes a proper peak level when said level difference is not more than said reference value.

20. The method according to claim 16, further comprising:

calculating a weighted average level of the detected peak level and the detected average level at a predetermined ratio; and carrying out at least one of the shutter speed control in said electronic shutter and the gain control in said amplifier circuit so that selected one of said weighted average level and the detected peak level approaches corresponding one of a proper weighted average level and a proper peak level when said level difference is not more than said reference value.

21. The method according to claim 16, further comprising:

detecting a peak level difference between the detected peak level and a proper peak level; and controlling the shutter speed in said electronic shutter so that the detected peak level difference becomes small.

22. The method according to claim 16, wherein both the shutter speed control and the gain control are carried out, when said level difference exceeds the reference value.

23. In an imaging apparatus comprising an electronic shutter in which a shutter speed is controlled, an imaging device for imaging a subject under exposure conditions realized by said electronic shutter to output a video signal representing an image of the subject, and an amplifier circuit for amplifying a video signal outputted from said imaging device, a method of controlling the imaging apparatus comprising the steps of:
detecting a peak level and an average level of the video signal outputted from said imaging device;
determining a weight ratio so that the larger a level difference between said detected peak level and said detected average level is, the larger the weight ratio is, whereas the smaller said level difference is, the smaller the weight ratio is;
calculating a weighted average level of said peak level and said average level in accordance with the determined weight ratio; and
carrying out shutter speed control in said electronic shutter and gain control in said amplifier circuit so that the calculated weighted average level approaches a proper weighted average level.

24. The method according to claim 23, wherein said amplifier circuit comprises a first amplifier circuit for amplifying the video signal outputted from said imaging device and a second amplifier circuit for finely adjusting the level of the video signal outputted from said first amplifier circuit;

said method further comprising:

carrying out the gain control in said first amplifier circuit when a difference between said calculated weighted average level and the proper weighted average level is large, while carrying out the gain control in said second amplifier circuit when said difference between the average levels is small.

25. The method according to claim 23, further comprising:

illuminating the subject; and imaging the subject under the illumination to obtain the video signal representing the image of the subject.

26. The method according to claim 23, wherein both the shutter speed control and the gain control are carried out so that the calculated weighted average level approaches the proper weighted average level.

* * * * *